Inventors
John A. Edgecumbe
Harvey L. Bishop
Attorneys

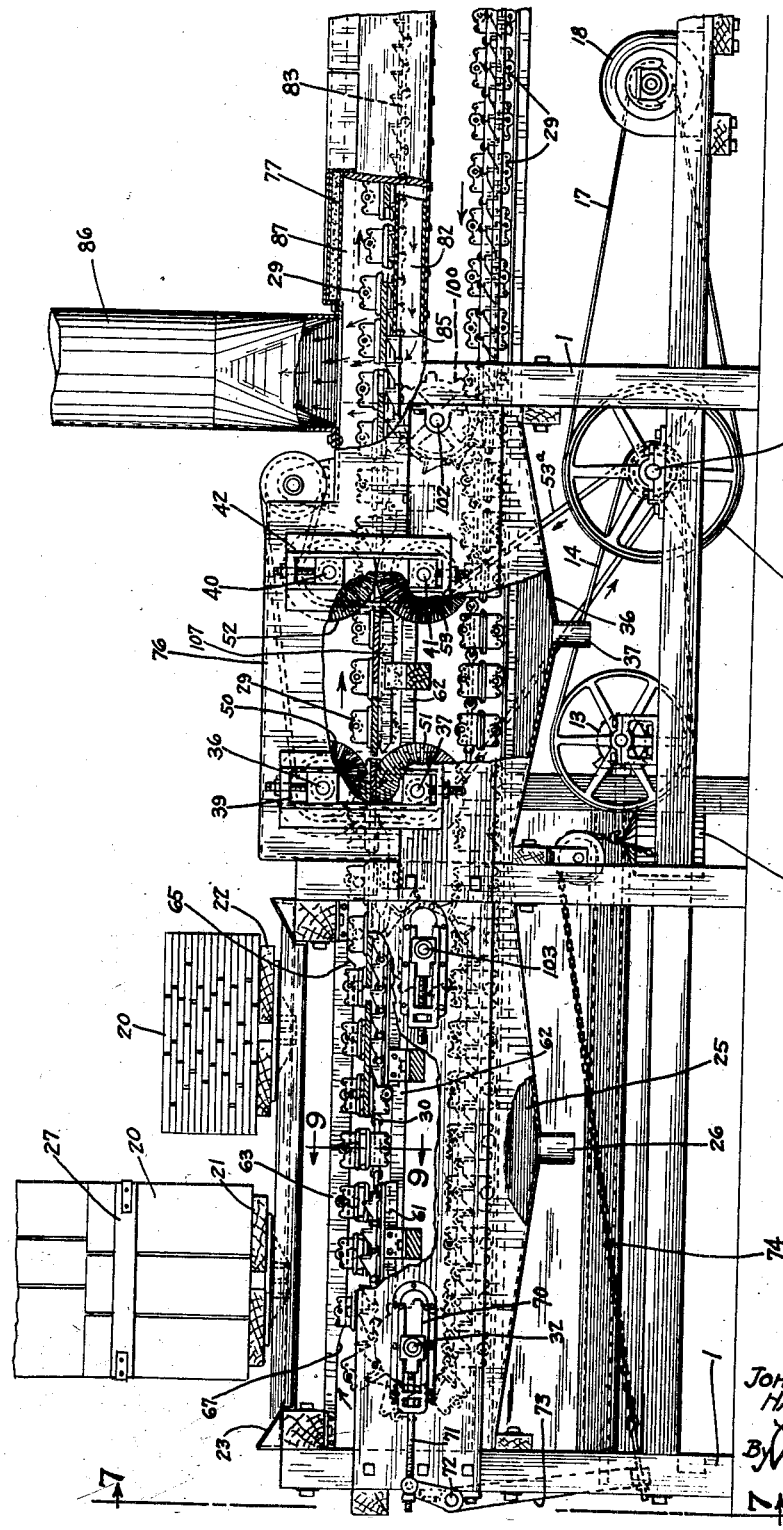

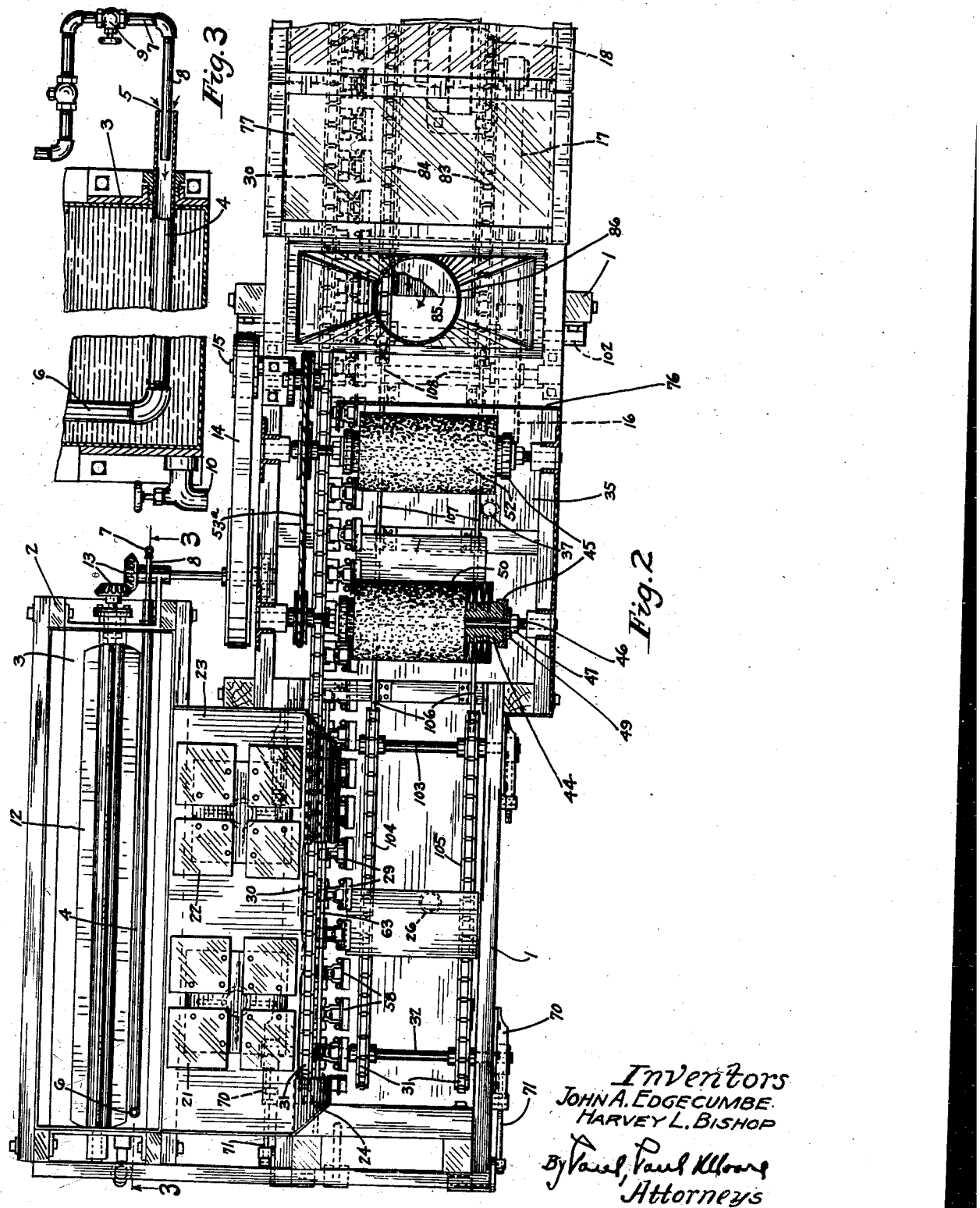

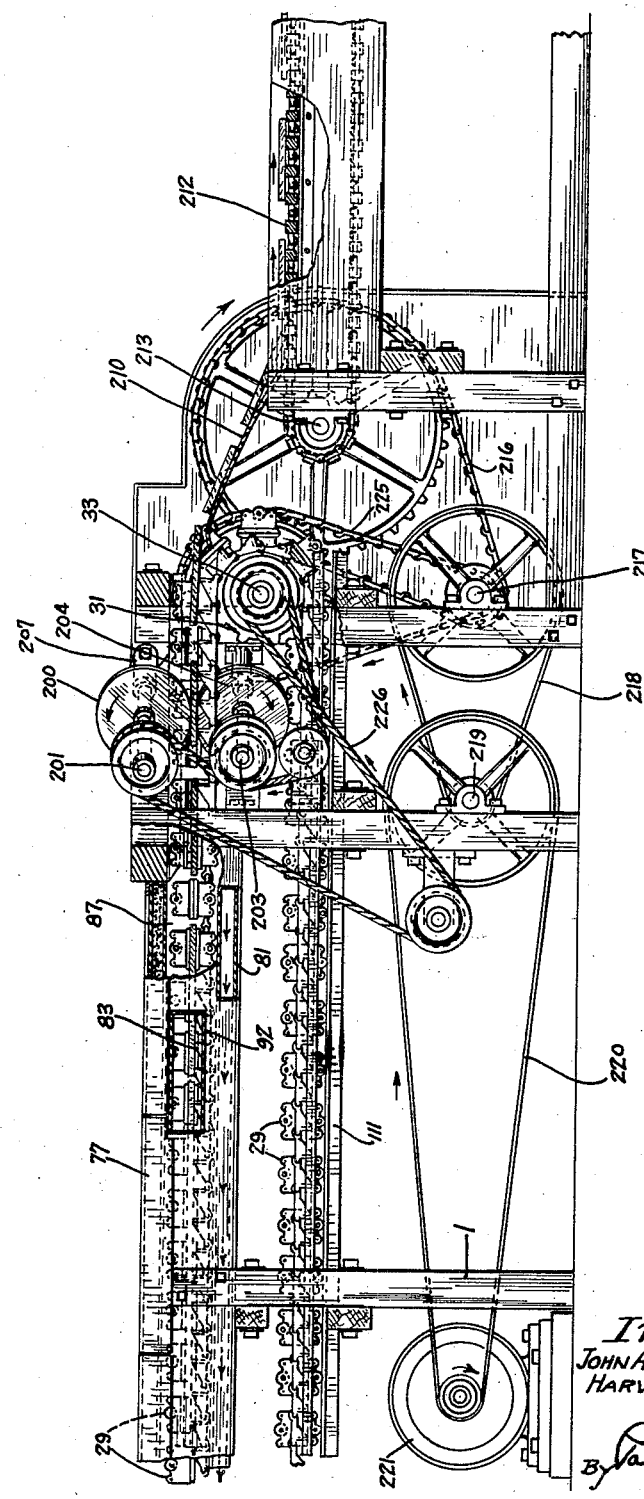

Inventors
JOHN A. EDGECUMBE
HARVEY L. BISHOP

Attorneys

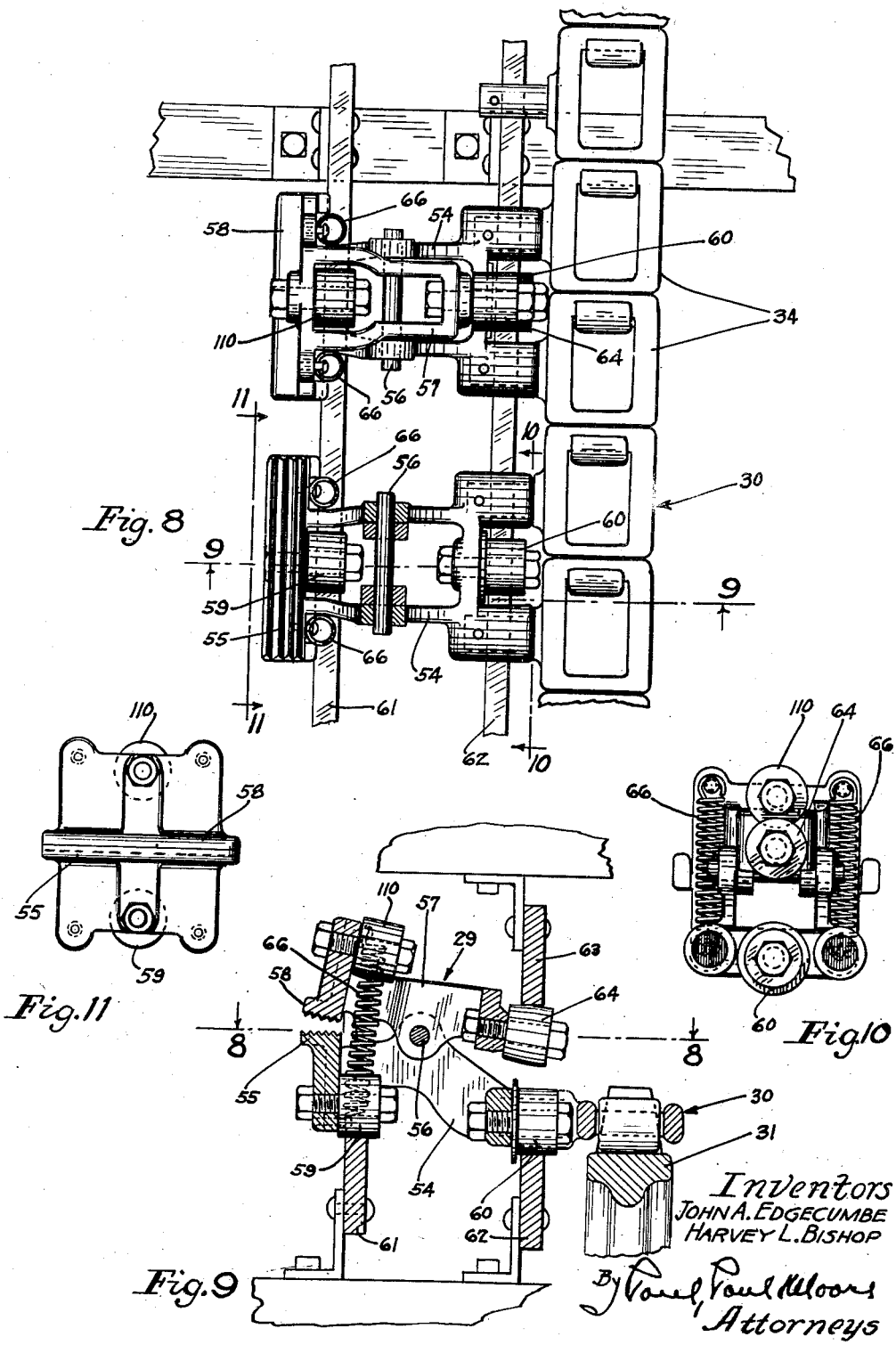

Patented May 31, 1932

1,860,664

UNITED STATES PATENT OFFICE

JOHN A. EDGECUMBE AND HARVEY L. BISHOP, OF MINNEAPOLIS, MINNESOTA, ASSIGNORS TO THE EDHAM CO. INC., OF ST. PAUL, MINNESOTA, A CORPORATION OF DELAWARE

METHOD OF AND APPARATUS FOR TREATING LIQUID IMPREGNATED MATERIALS AND PRODUCTS RESULTANT THEREFROM

Application filed February 17, 1930. Serial No. 429,034.

This invention relates to methods of and apparatuses for treating moisture absorbable products, such as cellulosic materials, including wooden shingles, and to the products resulting from such methods.

Among the objects are: to provide improved processes for treating wooden articles; to provide improved processes for impregnating wooden articles such as shingles; and to provide improved mechanisms for staining and spreading and rubbing the stain into the wood, and after-treating the stained and rubbed article to give it a superior surface finish.

Features of the invention include the means for accomplishing all the above mentioned objects, and the details of construction of these means are claimed along with the broader ideas of means.

Features and advantages of the invention will appear in the description of the drawings forming a part of this application, and in said drawings:

Figure 1 is a side elevation of a portion of the receiving end of the machine, with parts broken away;

Figure 2 is a plan view of the construction of Figure 1 with parts broken away;

Figure 3 is a detail vertical section on line 3—3 of Figure 2 through the stain vat;

Figure 4 is a side elevation of the delivery end of the machine with parts broken away;

Figure 8 is a plan view partly in section illustrating the clamping device;

Figure 9 is a vertical section on line 9—9 of Figures 1 and 8 showing the clamping jaws in open position;

Figure 10 is an end elevation viewed from line 10—10 of Figure 8 with the jaws closed; and Figure 11 is an end elevation viewed from line 11—11 of Figure 8 with the jaws closed.

Figure 7:
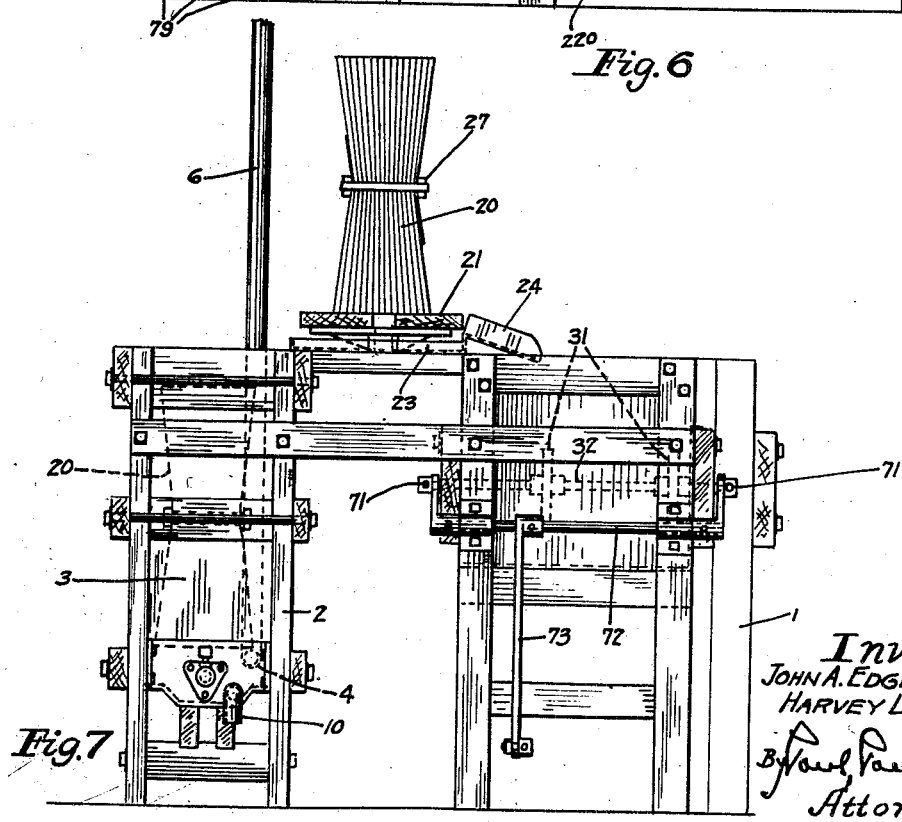
Figure 7 is an end elevation of the receiving end of the machine viewed from line 7—7 of Figure 1.

A suitable elongated frame is provided upon which the parts are mounted, the frame being generally indicated by the numeral 1. Referring first to Figures 2, 3 and 7: Upon a separate frame generally designated 2 is arranged laterally of the frame 1, a tank or vat 3 for receiving the treating liquid, for example a shingle stain, preferably maintained at about body temperature. This stain is heated, see Figure 3, by a submerged pipe 4 extending through the wall of the tank 3 and open as at 5 and having an upward extension 6 which leads to the atmosphere preferably at a point outside the building. The fuel for heating this pipe is provided by a suitable supply line 7 having a terminal extension 8 which projects loosely into the end of the pipe 4 and forms with this pipe a kind of Bunsen burner, supplying heat for pipe sections 4 and 6, which pipes are immersed in the liquid. A suitable valve 9 controls the fuel supply. A suitable drain valve 10 is provided for the vat. All details of construction are claimed.

A suitable agitator 12 is rotatably arranged in the tank lengthwise thereof, see Figure 2, and this paddle is driven by gearing 13 operated by a belt drive generally indicated at 14, including shaft 15 having a suitable pulley for belt 14, and a pulley 16, see Figure 1, coupled by a suitable driving connection such as a belt 17 with a motor 18. The shaft 15 is also the drive shaft for certain shingle rubbing brushes later to be described. Details of construction, as well as the broader features, are claimed.

Now referring to Figure 7: This embodiment of the invention is designed for the treatment of shingles. The shingles indicated in dotted and full lines at 20 are first dipped into the vat of coloring or impregnating material and then successively placed upon suitable drain boards 21—22, see also Figure 1. Beneath the drain boards is arranged a catch receptacle 23, to which is attached another drain element 24 which leads into a receptacle 25, see Figure 1, which receptacle has a drain spout 26 beneath which a bucket, not shown, may be placed. After the shingles have been in the upright draining position shown in Figure 1 for a suitable time, the shingles are laid on the board 22, and the band 27 is cut. The operator standing on that side of the machine opposite the drain board then inserts the shingles one by one in clamping devices 29 of an endless carrier generally designated 30, the upper run of which passes through an elongated chamber wherein the work is rubbed and/or brushed and heat-treated. The details of the clamping device are shown in Figures 8 to 11, inclusive. The carrier 30 is suitably supported and driven by sprocket wheels 31 carried by shafts respectively indicated at 32—33. The carrier is composed of links 34, each member of a pair of which is pivotally attached to a clamping device 29, see Figures 8 and 9.

The endless carrier 30 including the clamping devices is operative over the drain tank 25 and over what may be termed a rubbing or stroking compartment 35 having a bottom 36 provided with a drain outlet 37 corresponding substantially to the outlet 26 previously referred to, for recovering the surplus stain removed by the rolling, or rubbing, and/or brushing process, which the work undergoes after staining. The movable (as distinguished from stationary) rubbing means is arranged over the tank 35, see Figures 1 and 2.

The methods of stroking, rolling, rubbing and/or brushing the shingle, as well as the means for carrying out these methods are each separate features of this invention.

In this instance, two pairs of brushes are shown, but it will be understood that rollers or other movable devices, covered with sacking or felt have been used and give good results, when rotated, or when moved with a rubbing action without rotation. However, rotating brushes give the best results as regards the quality of even and thorough impregnation or working-in of the stain or coloring material. Both means, as well as methods of operating, are claimed herein as being new in stain impregnating devices.

In the present embodiment the brushes or moving "rubbers" are arranged in pairs each composed of upper and lower elements which are either engaged with one another or are spaced a distance apart less than the thickness of the work which is to pass between them. These brushes or stain-working-in and stain distributing devices, in this instance are rotatable (but may be reciprocable) and are mounted on shafts, the upper element on shaft 36, and the lower element of this pair on a shaft 37. These shafts are arranged in journal boxes which in turn are vertically adjustable in guides 39. The upper brush of the second pair of brushes or stroking-in devices is supported on shaft 40 and the lower member of this pair on a suitable shaft 41, these shafts being vertically adjustable in suitable brackets 42. Referring to Figure 2, each brush includes a core 44 mounted upon its corresponding shaft, and a cap plate 45 is mounted on the shaft and clampingly engages the end of the core 44. These cap plates are provided at opposite sides of the core and the shaft is threaded as at 46 and a jamb nut 47 is engaged with these threads to clamp against a washer 49 which, in turn, rests against the cap plates 44. By this means, the brushes, as movable rubbing-in means, can be adjusted lengthwise of the shaft or crosswise of the direction of feed of the shingle. This construction is a feature of the invention. Each of the brushes 50—51—52 and 53 is mounted in the manner just described. The members of each pair of brushes are initially adjusted so that their peripheries engage substantially at the level of a shingle when it is held in a clamping device of the endless carrier.

The brushes are so arranged that all longitudinal surfaces of the shingle are at some time engaged by a brush which at point of contact with the shingle, or object being treated, is traveling in a direction opposite to the direction of feed, and also by a brush which is traveling in a direction of feed, whether the brush motion be reciprocatory or rotary. It is particularly desirable that each face side of greatest area of each shingle be brushed in a direction counter to direction of feed, and crosswise of the grain. In the arrangement shown, the upper brush of the first pair, brushes the shingle in direction of travel while the lower brush of this pair brushes it in a direction counter to its travel. The uppermost brush of the second pair brushes the shingle in a direction counter to direction of travel, and the lower brush of this pair brushes in direction of travel. The result is that opposite face sides of the shingle, as well as the corresponding longitudinal edges of each shingle are brushed in direction of travel and also in a direction counter to direction of travel, and thus the material is "worked" into the shingle, and is worked thereinto crosswise of the grain.

The brush axes are parallel with the long axis of the shingle as it passes through the brush. The shingle is held by the thinnest edge and is rubbed and/or brushed so that the stain is evenly spread and worked in over the entire area of all longitudinal surfaces of the shingle. This is an important feature. The brushes are substantially the same length as the shingle and the carrier draws a shingle through the moving brushes, or rubbers.

The shingle is held spaced from the sides of the oven so that all surfaces are exposed to heat action.

The brushes are driven from the shaft 15, in this instance by means of a belt passing over pulleys carried by the shafts 36, 37, 40 and 41, and by an idler pulley. The belt is indicated at 53ª and is arranged substantially as shown to obtain the desired directional rotation of respective brushes.

Reverting to the description of devices 29 by which the articles to be treated are drawn through the treating apparatus. Each device 29, see Figures 8 to 10 inclusive, includes an element 54 having a jaw 55 as the lower member of a pair of jaws. To the element 54 is pivotally attached as at 56 a lever 57 having a jaw 58 cooperative with the jaw 55. The element 54 is provided with rollers 59—60 cooperable with corresponding tracks 61—62. The roller 60 is flanged to prevent substantial lateral motion of the clamping device. Figure 9 may be considered to be a section on line 9—9 of Figure 1, with the jaws open, as before a shingle is inserted. The cam track 63, see Figures 1 and 9, functions to open the jaw, by engagement of roller 64 of lever 57 with track 63. At point 65 of this track, see Figure 1, the lever is released and assumes clamping position under the action of the springs 66. From point 65 the jaws clamp the work, and remain closed upon it until the shingle has been treated, after which the jaws are opened at point 68, see Figure 5, to release the work, after which the jaws again automatically close to be open again at point 67, see Figure 1. The shingle or other work is inserted between the jaws before the clamp reaches point 68 and is held by the operator until the jaw is closed and thereafter the piece of material is securely held and passed through the machine for further treatment. At point 68, see Figure 5, the roller 64 engages the track 69 (similar to track 63) also see Figure 6, and opens the jaws as shown in the latter figure, releasing the shingle. It should be noted at this point that a wide shingle or other piece of work may be secured by the action of two clamping devices, while a narrower piece may be held and fed by means of a single clamping device. After the jaws have been opened at point 68, means is provided for moving the shingle outwardly away from the jaws which means will be later described. The tripping track 69 holds the clamping jaws open long enough to permit the shingle to be moved away from the clamp.

A suitable tensioning device is also provided for the carrier 30. Referring to Figures 1 and 2, the shaft 32 is mounted in suitable journal boxes which are slidable in guides 70 and these boxes are connected by rods 71 with arms which are carried by shaft 72, which shaft is suitably journaled at the end of frame 1 as shown in Figure 1. Lever 73 is also attached to the shaft 72 and the free end of the lever has attached thereto a chain 74 passing over a suitable pulley and having a counterweight 75. By this means, the proper tension of the carrier 30 is maintained.

An important feature of this invention, in addition to the features previously described, is the arrangement whereby the shingle or other suitable piece to be stained or treated, is, after being rubbed and/or brushed, carried through a heating chamber for a substantially predetermined length of time (about one to two minutes) and with the chamber at a substantially predetermined temperature (about 350° to 400° F.) in order not only to dry the liquid or stain but to set and harden the impregnating material. This, in itself, has been found to be a superior process for treating stained shingles after dipping, as distinguished from the previous processes in which the shingle was dipped and then allowed to dry naturally or at ordinary atmospheric temperature. There seems to be here a physico-chemical process involved, the nature of which is at present not thoroughly understood but which produces a superior product which is claimed herein.

The brush chamber is provided with a cover casing 76 and this casing may be continuous with a casing 77 of the heat-treating chamber 87 which encloses the upper run of the conveyor 30, and through which chamber the impregnated articles are passed, after being rubbed.

Figure 5:
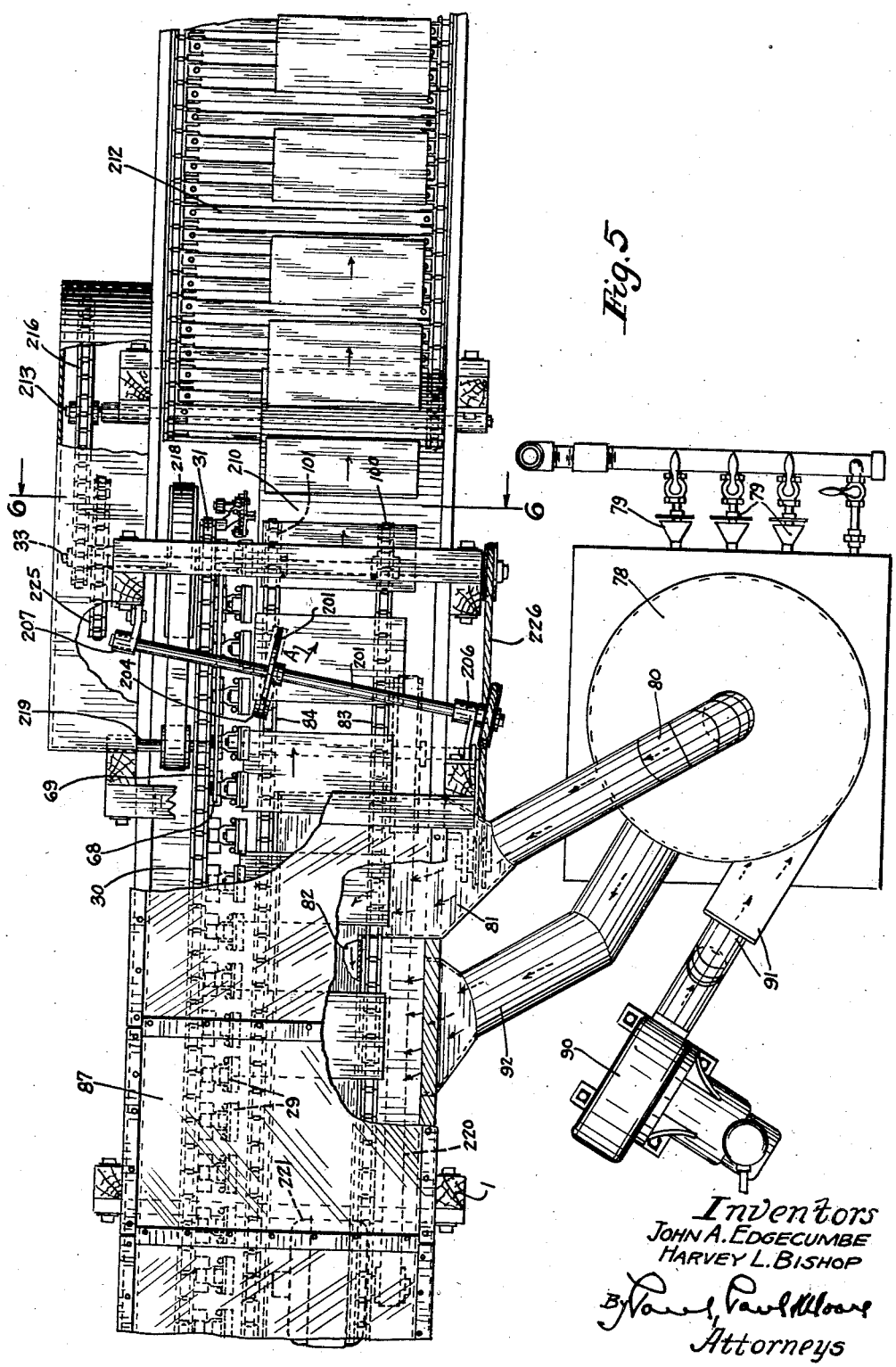
Figure 5 is a plan view of the delivery end of the machine also illustrating the heating plant.
Figure 6:
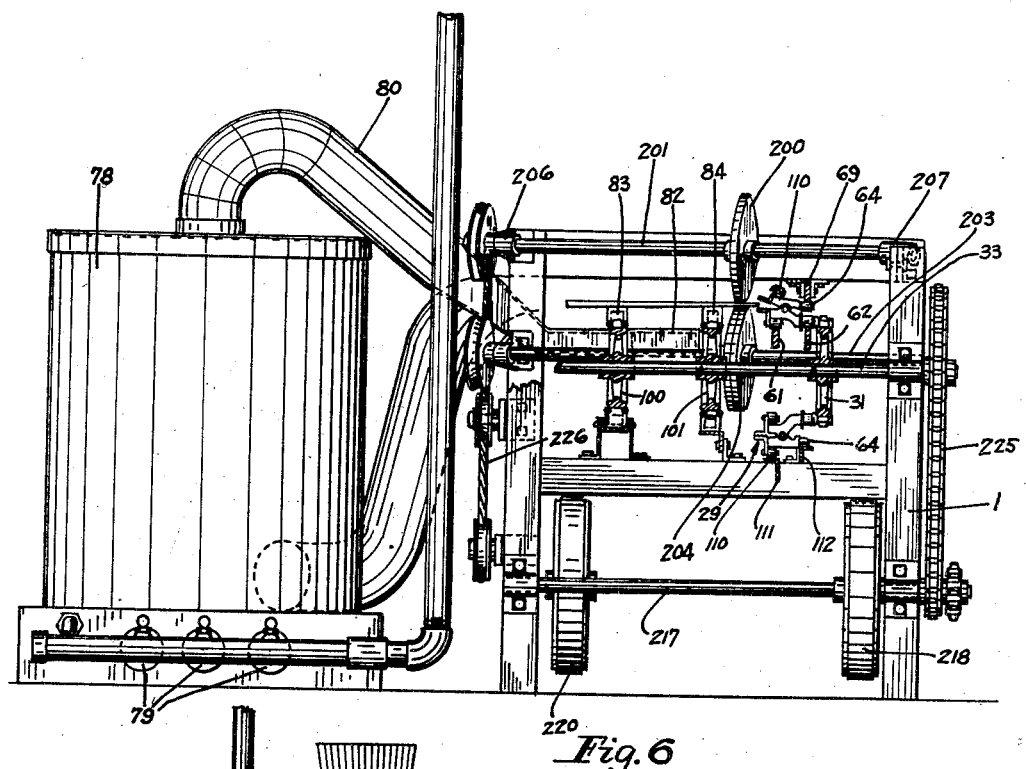
Figure 6 is an end elevation viewed from line 6—6 of Figure 5.

The walls of the casing 77 are preferably of heat insulating material, and any suitable means may be provided for heating the casing, such as a drum or furnace generally designated 78, see Figures 5 and 6. The sectional construction of this device has not been shown, but it may have the construction of a hot air furnace and is provided with heating means generally designated 79 such as a series of burners with suitable means for supplying gas thereto. The fumes from the burners are passed through the pipe 80 and into an extension casing 81, see Figure 5, thence into a flat casing 82 extending lengthwise of and arranged beneath the upper run of a pair of spaced apart endless work supporting carriers, generally respectively designated 83—84, see Figure 6. The function of these endless carriers will later be described. The flat casing 32 delivers at point 85, see Figure 1, into the chamber 87 and thence into a vertical vent pipe 86, which also acts to vent the chamber 87. Air is delivered to the heating drum space of the heating apparatus by means of a suitable forced draft apparatus 90 through pipe 91, and after being heated is forced through pipe 92 to the chamber 87 whence it passes through the chamber in a direction counter to the travel of the shingle to be vented to the atmosphere through the pipe 86.

This heating arrangement is a feature of this invention and it will be noted that substantially all the heat generated by the heating apparatus is utilized for drying and heating the articles as they pass through the chamber 87. The brushes 52 and 53 should be so related to the casings 76 and 77, that heat from the chamber 87 does not escape past them in a direction counter to the travel of the clamp-conveyor, but is made to pass upwardly through the vent 86 as shown in Figure 1.

The conveyors 83—84 are mounted on and operated by sprockets 100—101 (see Figure 6) mounted on shaft 33, see Figure 6, and by corresponding sprockets mounted on shaft 102, see Figure 1, this shaft being adjacent the brushes and parallel with the axis of the brush. The function of the conveyors 83—84 is to support a shingle, one end of which is held by a clamping member or a plurality of clamping members 29, and the shingle is thus supported at least until the clamping devices are operated to release it. As a matter of fact, as shown in Figure 5, the shingle is supported after its release from the clamping device, and while it is being moved mechanically by a device later to be described, in a direction crosswise to the direction of feed, and away from the clamp.

Referring to Figure 2, it will be noted that the shaft 32 and another shaft 103 support sprocket wheels which, in turn, support conveyor chains 104—105 which are aligned lengthwise of the machine with the conveyors 83 and 84, and these last mentioned conveyors support the shingle, part of the time before it is passed through the brushes. The links of both sets of conveyors 83—84 and 104—105 are so constructed as to have only substantially a knife-edge contact with the work, when performing their supporting function. A series of pairs of shingle supporting tracks are aligned with and lie between the ends of the conveyors 83—84 and 104—105 and are arranged at the level of the meeting surfaces of the brushes and extend beyond the brushes on each side. In this instance, there are three pairs of these tracks which are respectively designated 106—107 and 108. Their function is substantially the same as that of conveyors 83, 84 and 104, 105.

Reverting to the clamping device, first see Figure 9. The lever 57 is provided on the same side as the jaws with a roller 110, the function of this roller in conjunction with roller 64 is to support the clamps and avoid twisting strain on the chain 30. To these ends the rollers engage corresponding tracks 111—112 see Figure 6, after disengagement of the shingle from the clamp, and as the clamping device arrives at the plane of the lower run of the conveyor. The clamps of both runs are thus supported. These details of construction are claimed herein, along with other features of the invention.

Another important feature of the invention, is the means provided for moving the shingle in a direction away from the clamps after release preparatory to the delivery of the shingle to a conveyor of slatted construction, in which the slats extend transversely of the line of feed, and from which the completely treated shingles are removed by an attendant and rebundled, referring particularly to Figures 4, 5 and 6.

The shingle disengaging means operates upon the upper and lower face of the shingle or other article, as best shown in Figure 6, and said means includes a disk 200 mounted upon a shaft 201 held in suitable bearings carried by the frame 1, and adapted for a relatively slight amount of vertical motion. Arranged below and spaced from the shaft 201 is another shaft 203 upon which are mounted a pair of disks 204. The peripheries of the disks are adapted to engage at the level of the work and the upper shaft is arranged so that it has a slight vertical play to compensate for varying thicknesses of the work. The shaft is pivoted for this slight adjusting motion in bracket 206, and the opposite end of the shaft is loosely held in bracket 207. The axes of the shafts 201—203, are at an angle to the long axis of the shingle and to its direction of feed, the faces of the disks thus being divergent with respect to the longitudinal working faces of the clamps in direction of feed. Means is provided for driving the shafts and they are driven so that the disk peripheries at point of engagement with the shingle move also in direction of feed. The result is that when the shingle is engaged by the disks it has a compound motion which includes forward, as well as lateral, motions. This motion is roughly indicated by arrow A, see Figure 5, and by this motion the shingle is positively moved away from the open jaw, and is delivered by conveyors 83—84 to an inclined table 210 and thence to a slotted conveyor 212 driven by suitable sprocket wheel connections from shaft 213. This slatted conveyor is preferably covered with foraminous material (not shown) to prevent accidental entry of the shingles between the slats. A conveyor composed entirely of foraminous material may be used, the object being to obtain ventilation and after-drying of the impregnated material after it leaves the drying and/or baking chamber. The shaft 213 is driven by chain connection 216 from shaft 217 which shaft is, in turn, driven by a belt 218 from shaft 219, shaft 219 being driven by belt 220 from a suitable device such as a motor 221. Referring to Figure 6, shaft 217 drives the conveyor shaft 33 by means of sprocket chain connections generally indicated at 225, and the feed disk shafts 201—203 are provided with pulleys which are driven by belt 226 from shaft 33, suitable idler pulleys being employed.

Heretofore it has been the practice to dip bundles of shingles while in the bundle in an attempt to impregnate them with stain, and the shingles, after dipping, have simply been allowed to dry, in the bundle, naturally or at ordinary atmospheric temperatures.

One of the important features of this invention is the application of the covering and/or impregnating material by means of brushes or "rubbers", "spreaders" or "workers" either having rotative or translative motions, and operative in a manner to act over the entire area of all longitudinal faces, particularly the faces of greatest area such as the weather faces. Another important feature is the use of rotative brushes operating at opposite sides of the shingles, in pairs, one brush of each pair being rotated in direction of feed of the material and one brush of each pair being rotated in a direction opposite to direction of feed of the material, so that each face side of each shingle will be brushed in a direction counter to direction of feed. Another important feature of the invention relates to the application by brushing across the surface of the shingle in a direction transversely to the grain. This is a particularly valuable feature because it has been found that impregnation is more perfect, that there is a deeper penetration and more even distribution of the material and that apparently the impregnating material is in some now unexplained way retained by the wood for a greater length of time than when it is applied by a brush or rubber stroking lengthwise with the grain, or by application by other methods. The distinction herein is that the covering or impregnating material is applied by brushing or rubbing in a direction transversely of the grain. Another valuable feature of the invention relates to the heating and/or baking of the shingle or wooden stain impregnated object after impregnation, this operation acting both to dry and to set and to surface harden the shingle, and when using certain staining substances to oxidize linseed oil.

We claim as our invention:

1. A process for staining wooden objects which consists in first applying the stain, and then working the stain into the object by a rubbing action only in a direction transverse to the grain.

2. A machine for staining shingles comprising movable means for stroking opposite longitudinal surfaces of the shingle after application of the stain, said means adapted to act in a direction transverse to the grain, and means for baking the shingle thereafter.

3. A machine of the class described comprising brushes arranged in pairs, means adapted to feed a stained shingle between the pairs, and means for rotating the brushes in a manner to cause the face sides of greatest area of the shingle to be alternately brushed in opposite directions.

4. A machine of the class described comprising brushes arranged in pairs, means adapted to feed a stained shingle between the pairs with its grain substantially parallel with the axes of the brushes, and means for rotating the brushes in a manner to cause the face sides of greatest area of the shingle to be alternately brushed in opposite directions, and in a direction opposite to direction of feed.

5. A device of the class described comprising means adapted to releasably clamp and move a shingle after staining, moving brushes adapted to engage the shingle as it is moved and rub the stain thereinto, said brushes acting on the surfaces of greatest area and rubbing only transversely of the grain alternately in opposite directions.

6. A shingle staining machine including pairs of brushes, means for feeding stained shingles in a manner to be passed between the members of each pair and rubbed, and means for rotating the brushes so that the faces of greatest area of the shingles are alternately brushed and rubbed in opposite directions.

7. A machine of the class described comprising brushes, means adapted to feed a stained shingle between the brushes, in a manner to cause the face sides of greatest area of the shingle to be brushed, means for rotating the brushes, a chamber adapted to receive the shingles after brushing and means for heating the chamber, said conveying device including clamping means automatically operable for securing the shingles for passage through the brushes and through the chamber, means for automatically operating the clamping means to release the shingle after treatment.

8. A machine of the class described comprising brushes, means adapted to feed a stained shingle between the brushes in a manner to cause the face sides of the greatest area of a shingle to be brushed, means for rotating the brushes, a chamber adapted to receive the shingles after brushing, and means for heating the chamber, said conveying device including clamp means automatically operable for securing the shingles for passage between the brushes and through the chamber, means for automatically operating the clamping means to release the shingle after treatment and automatically operable means for moving the shingle in direction away from the clamping means after automatic release.

9. A process for staining wooden objects which consists in first applying the stain then working the stain into the object by a brushing action on both of two opposite faces, only in a direction transverse to the grain.

10. A process for staining wooden objects which consists in first applying the stain, then working the stain into the object by a rubbing action only in a direction transverse to the grain.

11. A process for staining wooden objects which consists in first applying stain, then working the stain thereinto simultaneously on both faces, and then baking at temperatures ranging between 350° and 400° Fahrenheit.

12. A process for staining wooden objects which consists in first applying stain, then working the stain into the object, and then baking at temperatures ranging between 350° and 400° Fahrenheit.

13. A process for staining shingles which consists in applying stain, moving the shingle and simultaneously working the stain into both faces by brushing action only in a direction transverse to the grain, and alternately in opposite directions.

14. A machine for staining shingles, comprising pairs of rotatable brushes, means for rotating respective pairs in opposite directions, and means for carrying a stained shingle between the brushes with the grain of the shingle substantially parallel to the axes of rotation of the brushes.

15. A machine for staining wooden articles comprising a pair of rotatable brushes and means for carrying a stained shingle between the brushes with the grain of the object substantially parallel with the axes of rotation of the brushes.

16. A process for staining wooden objects which consists in first applying stain, and then working the stain into the object by rotary brushing action applied in a direction transverse to the grain, and then baking the object.

17. A process for staining wooden objects which consists in first applying stain, then working the stain thereinto simultaneously on both faces and in direction transverse to the grain, and then baking at temperatures ranging between 350° and 400° Fahrenheit.

In witness whereof, we have hereunto set our hands this 13th day of February, 1930.

JOHN A. EDGECUMBE.
HARVEY L. BISHOP.